United States Patent [19]

Catotti et al.

[11] 4,006,397
[45] Feb. 1, 1977

[54] CONTROLLED BATTERY CHARGER SYSTEM

[75] Inventors: Arthur J. Catotti; John S. Hodgman; Ferdinand H. Mullersman, all of Gainesville, Fla.

[73] Assignee: General Electric Company, Columbus, Ohio

[22] Filed: Nov. 1, 1972

[21] Appl. No.: 302,908

[52] U.S. Cl. .................. 320/31; 320/35; 320/39
[51] Int. Cl.² ........................... H02J 7/04
[58] Field of Search .................. 320/20, 35, 39, 40, 320/31

[56] References Cited

UNITED STATES PATENTS

| | | |
|---|---|---|
| 3,531,706 | 9/1970 | Mullersman ............... 320/35 X |
| 3,626,270 | 12/1971 | Burkett et al. ............... 320/35 |
| 3,652,915 | 3/1972 | Eberts ............... 320/35 X |

Primary Examiner—Robert J. Hickey
Attorney, Agent, or Firm—D. A. Dearing; D. J. Voss; F. L. Neuhauser

[57] ABSTRACT

A controlled battery charger system is provided wherein a rechargeable battery is charged at a high charge rate and the voltage and temperature of the battery are both monitored by sensing means which are coupled to switching means to shut off the high charge-rate current when either the temperature or the voltage of the battery reaches a predetermined level.

16 Claims, 6 Drawing Figures

4,006,397

CONTROLLED BATTERY CHARGER SYSTEM

BACKGROUND OF THE INVENTION

This invention relates to battery chargers and more particularly to battery chargers having means associated therewith for sensing conditions in the battery.

The fast charging of batteries such as, for example, nickel-cadmium cells, involves problems relating to both overvoltage and thermal conditions. Charging beyond a predetermined voltage may cause an unacceptable level of gassing which in turn may damage the separators, and the plates, or the resultant pressure may rupture the cell casing itself. Overheating can also result in increased gassing rates as well as problems from high temperature itself as is well known to the art.

Because of the notoriety of these problems, the prior art is replete with temperature-sensitive charging circuits, voltage sensing charging circuits, and temperature-compensated voltage sensing circuits. In most instances, however, the prior art has not been able to satisfactorily solve the problems which lead to battery damage. Batteries using voltage-sensing means require cells having closely controlled and matched cell voltage characteristics. Even with such ideal battery characteristics, the battery may be charged with these systems at temperatures so high or so low as to cause damage.

The difficulty of solving both voltage and temperature problems by sensing voltage is due, at least in part, to the fact that the operation of the battery charging system may be in widely varying ambient conditions making it difficult, for example, to provide sufficient temperature compensation in a voltage sensing circuit for all possible operation conditions. For example, a temperature compensated voltage sensing battery charging system might still expose the battery to harmful heat levels before the preselected voltage level was reached due to high ambient temperature or as caused by repetitive charge-discharged cycles. Conversely, a battery charging system exposed to a very cold ambient and depending only on temperature as a control means might continue in the overcharge condition without reaching the predetermined temperature cut-off point. A battery charging system in an airplane, for example, may be exposed to a very high ambient temperature on the ground in an equatorial zone and to very low temperatures in flight.

SUMMARY OF THE INVENTION

It is, therefore, an object of the invention to provide a charger having co-operating temperature sensing means and voltage sensing means. This and other objects of the invention will become apparent from the description of the drawings.

In accordance with the invention a battery charger is provided having charging circuit means therein, including a high charge rate circuit controlled by temperature sensing means and voltage sensing means.

DESCRIPTION OF THE INVENTION

Figure 1:
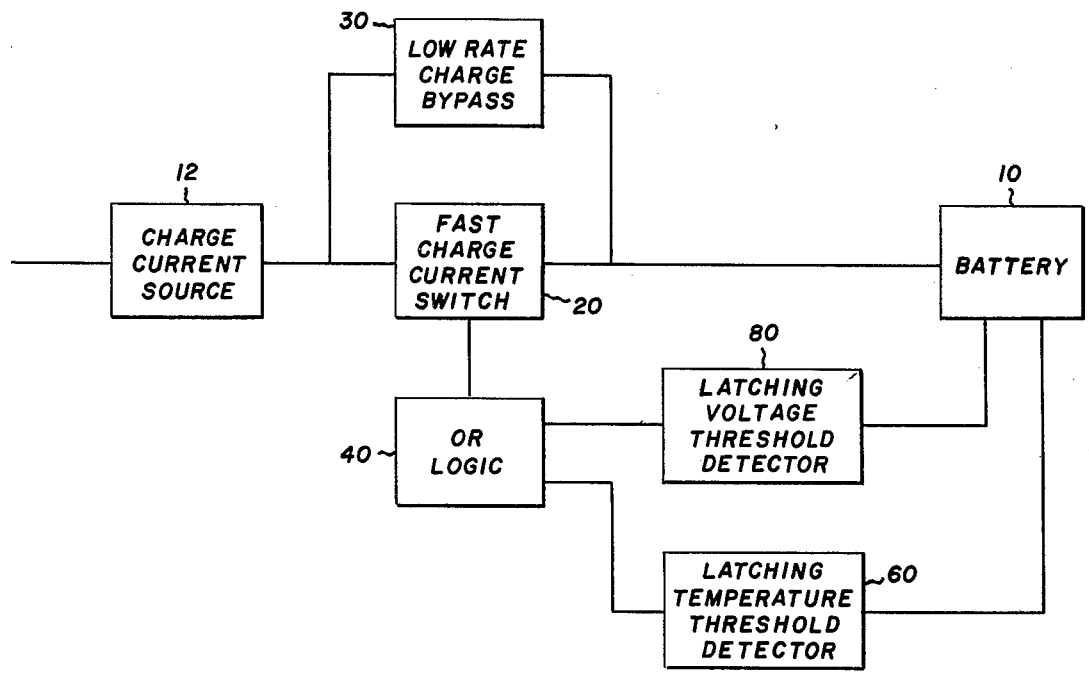
FIG. 1 is a functional block diagram of the charging system of the invention.

Referring now to FIG. 1, the charge control system is illustrated in block diagramatic form. A battery 10 comprising one or more cells is charged from a rectified current source 12 which may be conveniently powered from an AC line source. Current from source 12 is fed to battery 10 through a current switch 20. Switch 20 may comprise, in its simplest form, merely a relay to switch the current off. A low rate charge bypass 30 may be optionally provided to pass charge current to the battery 10 from current source 12 at a low rate when switch 20 is turned off. Switch 20 is in turn controlled by OR logic 40 which is in turn coupled to a temperature detecting means 60 and a voltage detector means 80.

Temperature detecting means 60 is thermally coupled to battery 10 to monitor its temperature and to convert the sensed temperature into a signal which is fed to the circuit 40. Voltage detecting means 80 senses the voltage of one or more of the cells of battery 10 and feeds a corresponding electric signal back to logic circuit 40 as well. The logic compares each of the voltages respectively received from either voltage sensing means 80 or temperature sensing means 60 to a reference voltage. When the received voltage from either sensing means exceeds the reference voltage as will be explained in more detail below with respect to FIG. 2, a signal is passed to current switch 20 to disconnect the fast charge current path. Thus two independent parameters, temperature and voltage, are independently sensed and then translated into a signal voltage which is transmitted to the current switch without regard to whether the signal originated from the temperature or voltage sensor.

Thus the system can be set up to provide a temperature cut-off--that is, an interruption of the high charge rate--at a preselected temperature beyond which damage to the battery could occur. At the same time the system provides a voltage cut-off, i.e., an interruption of the high charge rate, when a predetermined battery voltage is reached. Since the voltage signifying full charge rises as the temperature decreases in electrochemical cells such as, for example, nickel-cadmium cells, such a cut-off protects the battery at low temperatures when the thermal sensing means would be less effective.

It should be noted here that the voltage sensing means may, as well, be thermally compensated by a thermal sensor in accordance with the invention to provide some battery temperature compensated range of voltage cut-off. This thermal sensor in the voltage sensing circuit, however, is still independent of the thermal sensing means. In such a system the thermal sensing means still provides protection in high ambient temperature conditions while the thermally compensated voltage sensing means provides protection in low ambient temperature conditions.

Figure 2:
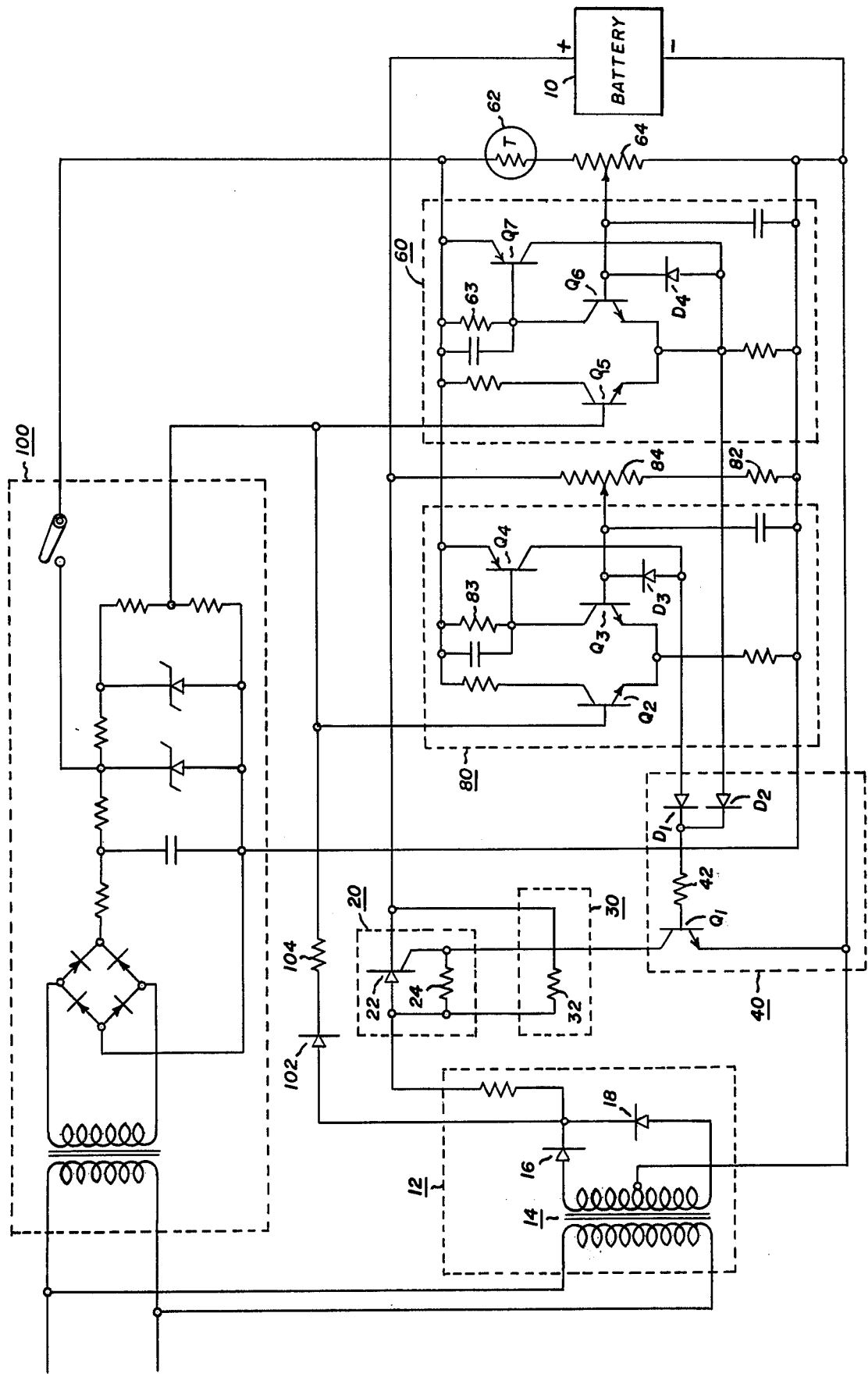
FIG. 2 is a schematic diagram illustrating a particular embodiment of the invention.

Turning now to FIG. 2, a circuit is schematically shown corresponding to the block diagram of FIG. 1. Battery 10 is charged by charge current source 12 which comprises a transformer 14 and diodes 16 and 18 which provide a full wave rectified battery charge source. Current switch 20 in the illustrated embodiment comprises an SCR 22 and resistor 24 connected between the gate and the anode of the SCR. Low rate bypass 30 is shown which comprises a resistor 32 which bypasses SCR 22.

Current switch 20 is controlled by logic 40 which comprises NPN transistor Q1, which has its collector coupled to the gate of SCR 22 and its emitter connected to the negative terminal of battery 10. The transistor Q1 when in a conducting state diverts current from the gate of SCR 22 preventing it from conducting. The base of transistor Q1 is in turn coupled through a resistor 42 to two diodes D1 and D2, which are respectively connected to voltage sensing means 80 and temperature sensing means 60. A signal of sufficient magnitude from either of these sensing means provides sufficient bias to the base of transistor Q1 to cause sufficient conduction through the transistor to maintain SCR 22 in a non-conducting state.

Voltage detecting means 80 comprises a differential amplifier having transistors Q2 and Q3 which are preferably matched to avoid temperature dependency. The base of transistor Q2 is referenced to a reference voltage from a reference voltage source 100. The base of transistor Q3 is connected to a voltage divider which is placed across the battery. As the battery voltage rises, the voltage on the base of the transistor Q3 rises proportionately. When this voltage rises sufficiently with respect to the reference voltage on the base of transistor Q2, the differential amplifier becomes unbalanced such that a larger current begins to flow through transistor Q3, thereby changing the voltage drop across resistor 83, which is connected between voltage source 100 and the collector of transistor Q3 as well as the base-emitter of another transistor Q4. The resulting change in the bias on the base of transistor Q4 causes an increase in emitter-collector current flowing through transistor Q4, which then passes through diode D1 to the base of transistor Q1 in the logic circuit 40, thereby shutting off switch 20 as previously described. The collector-emitter current passing through Q4 also passes through diode D3 back to the base of transistor Q3 to thereby provide a latching action.

The voltage divider mentioned above which is placed across battery 10 and which provides the signal voltage to the base of transistor Q3 comprises a first resistor 82 and a second variable resistor 84. Variable resistor 84 is connected through its variable contact to the base of transistor Q3 to thereby provide means for adjustment of the threshold voltage to be sensed by the voltage sensing means and then applied to the logic means.

It should be noted that transistor Q4 need not be temperature compensated because the series circuit connected to the base of Q4 comprising transistor Q3 and resistor 83 provides amplification which is great enough to render any temperature sensitivity of transistor Q4 relatively of little effect.

It should further be noted that the circuit shown in FIG. 2 provides a voltage sensing of the voltage on battery 10 during the non-charging portions of the cycle, that is between the peaks of the ripple charging current. This is designed to provide a more accurate sensing of the actual battery voltage rather than the sensing of voltage transients due to voltage fluxuations or the like in the charging circuit. This is accomplished by feeding a portion of the charging source voltage via diode 102 and resistor 104 to the reference voltage source to superimpose on the constant reference voltage a ripple voltage greater than any expected to appear at the base of transistor Q3. The value of resistor 104 is chosen to assure an adequately large superimposed ripple. Diode 102 assures that there will be finite period of time during which the magnitude of superimposed ripple is zero.

Temperature detection means 60 is designed to function somewhat similarly to voltage detection means 80 to provide a voltage to diode D2 in logic circuit 40. Temperature detecting means 60, however, uses a voltage divider wherein a negative temperature coefficient thermistor 62 and a variable resistor 64 are used in a voltage dividing circuit using a reference voltage from the reference voltage source. Thermistor 62 is thermally coupled to battery 10 while variable resistor 64 is connected to the base of a transistor Q6 to function in a similar manner to the coupling of the variable resistor 84 to the base of transistor Q3 in the voltage sensing circuit. Thus transistors Q5 and Q6 comprise a differential amplifier thermal sensing detector wherein the base of transistor Q5 is also coupled to reference voltage 100. When the temperature of the battery rises, the voltage across thermistor 62 changes which raises the bias on the base of transistor Q6 and provides for an increase in the collector-emitter current passing through transistor Q6 to thereby change the voltage drop across resistor 63 which in turn changes the bias on the base of transistor Q7, increasing the collector-emitter current therethrough to provide a signal through diode D2 to logic circuit 40. In this sensor, as in the voltage sensor, a portion of the collector-emitter current through transistor Q7 is fed back through a diode D4 to the base of transistor Q6 to provide a latching circuit therewith.

Figure 3:
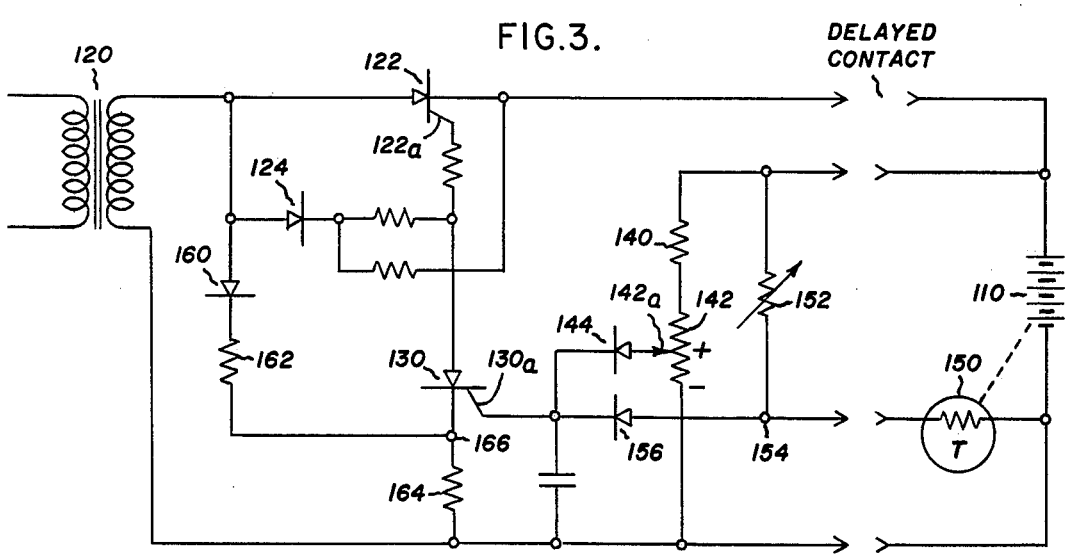
FIGS. 3–6 are schematic diagrams of alternate embodiments of the invention.

In FIG. 3 another embodiment is illustrated. In this circuit AC current is rectified by SCR 122 and diode 124 to alternatively supply high or low rate charging to battery 10. The charger is switched from high rate to low rate by diverting current from gate 122a of SCR 122. Current to gate 122a is controlled by SCR 130 which, in turn, has a gate 130a which determines, via voltage divider circuits comprising respectively the voltage sensing means and the temperature sensing means, whether SCR 130 conducts.

The voltage sensing means comprise a first resistor 140 and a second variable resistor 142 in series with resistor 140. Resistor 140 is coupled to the positive side of battery 10 and the opposite end of resistor 142 is attached to the negative terminal of battery 10. Variable contact 142a on resistor 142 is coupled to gate 130a of SCR 130 through a diode 144. Resistor 142a is adjusted to provide a voltage sufficiently positive to fire SCR 130 when the voltage on battery 10 reaches a predetermined level beyond which further charge would damage the battery.

The temperature sensing means in this embodiment comprise a thermistor 150 and a variable resistor 152 coupled together as a voltage divider across battery 10. The voltage at point 154 therebetween is fed through a diode 156 to gate 130a of SCR 130.

In operation then, the battery during charging thereof increases in temperature as well as in output voltage. As the temperature increases, the resistance of thermistor 150 increases. This changes the voltage drop across thermistor 150, raising the voltage at point 154. Should the voltage at point 154 rise to a level sufficient to fire SCR 130, the voltage on gate 122A of SCR 122 will fall, shutting off SCR 122 and thereby discontinuing the high current charging of battery 10. Thus an increase in temperature beyond a predetermined point results in shut-off of the high current charger. The actual setting or selection of the temperature is controlled by adjustment of variable resistor 152.

It should be noted that, in the illustrated embodiment, thermistor 150 is connected to the negative terminal of battery 10 and, therefore, point 154 is always more positive. Thermistor 150, therefore, is selected to have a positive temperature coefficient. Conversely, if the position of thermistor 150 and variable resistor 152 were reversed, that is, thermistor 150 was connected to the positive terminal of battery 10, the thermistor would require a negative temperature coefficient. In either case, of course, thermistor 150 should be thermally coupled to battery 10 for maximum effectiveness in sensing and transmitting the heat generated by the battery to the thermistor.

Thus deleterious high temperatures are avoided by shut-off of the charge current as temperature rises beyond a safe level. Should the battery, however, reach a charge condition beyond which further charging would damage the cell in a cold ambient wherein the temperature sensing means would be ineffective, voltage of the battery is sensed by the voltage across resistors 140 and 142. As mentioned previously, most cells such as, for example, nickel-cadmium cells, exhibit a voltage indicative of a full charge condition inversely proportionate to the temperature of the cell. That is, the lower the temperature of the cell, the higher the voltage indicative of a full charge. Therefore, the voltage point selected for voltage cut-off at lower ambient temperature conditions can be set higher than the corresponding voltage at high temperatures. Thus in a low temperature full charge condition wherein the battery has reached full charge or, as in the more normal case, the battery has reached a condition approaching full charge and beyond which high charging should not be continued, the voltage across the voltage divider comprising resistors 140 and 142 rises sufficiently to provide a voltage at a variable contact 142a sufficiently high with respect to the negative terminal of the battery to fire SCR 130 to, in turn, divert current from gate 122a of SCR 22, thereby shutting off the high current charge circuit.

Thus under either high temperature conditions or high voltage conditions, a signal is alternatively fed back to SCR 130 to shut off the high charge current.

In the circuit illustrated in FIG. 3, an additional diode 160 is also provided in series with a resistor 162 and a second resistor 164 across the output of transformer 120. The cathode of SCR 130 is connected to the midpoint 166 between resitors 162 and 164. This additional circuitry permits charge termination, i.e., firing of SCR 130, only during periods of zero charge current. That is, the voltages of the battery sensors can only fire the SCR in between current pulses from the battery charger. Thus the variations in charge potential due to varying conditions in the charger and associated circuitry will not affect the calibration of the sensors.

Figure 4:
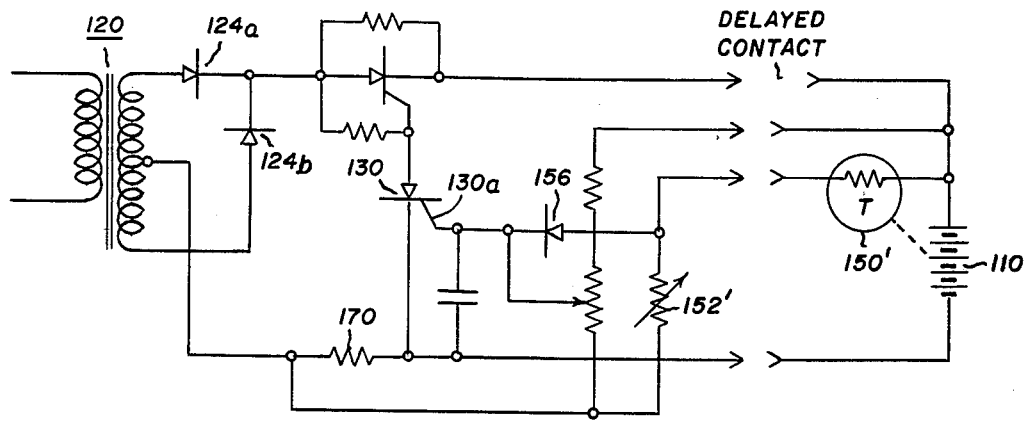

Turning now to FIG. 4, a modified version of the sensing system of the invention is shown. In this version, it will be noted that diode 144 in the voltage sensing circuit has been eliminated. This provides a lower impedance to the SCR, thus solving or mitigating the problem of keeping the SCR in a fired condition which, otherwise, with a very high impedance would necessitate that a larger current flow be maintained through SCR 130. It will also be noted here that diode 124 has been replaced by diodes 124a and 124b which are attached to the opposite legs of the secondary windings of transformer 120 to provide full-wave rectification. It should be further noted here that the use of either half-wave or full-wave rectification is optional, and one rectification means may be substituted for another in the circuits described.

In the circuit of FIG. 4 resistor 170 connects the center tap of transformer 120 to the negative pole of battery 110 in the cathode of SCR 130 to perform the same function as previously described with respect to resistors 162 and 164 and diode 160 in FIG. 3; i.e., to permit firing of SCR 130 only between the pulses of charge current.

It will be noted as well that, in the circuit of FIG. 4, thermistor 150 of FIG. 3 has been replaced by thermistor 150'. Thermistor 150' is a negative temperature coefficient resistor because, in the illustrated circuit, thermistor 150' is attached to the positive terminal of the battery. Thus a rise in temperature will result in a decrease in the resistance of thermistor 150' to thereby result in an increase in the voltage drop across resistor 152' thereby raising the voltage transmitted through diode 156 to gate 130a of SCR 130 to eventually fire that SCR when the voltage has reached a sufficient level.

Another problem which may be encountered in the selection of components to carry out the desired circuitry of the invention involves the possible self-heating of the thermistor such as thermistor 150 or thermistor 150' to cause large amounts of current to flow therethrough. This problem may occur regardless of whether the thermistor is a negative temperature coefficient device or positive temperature coefficient.

Figure 5:
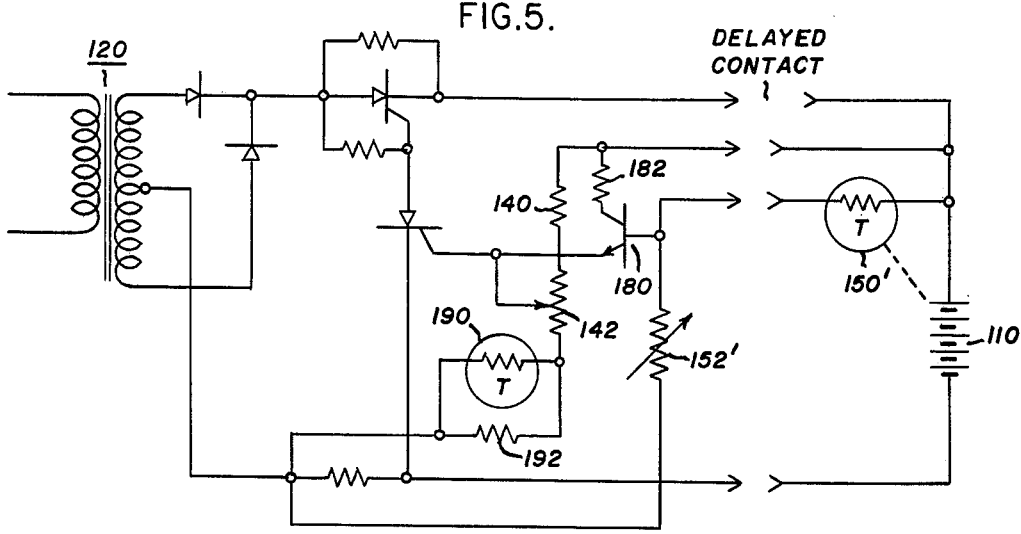

In FIG. 5 an alternate circuit is shown wherein diode 156 is replaced by a transistor 180 having its base coupled to a point between thermistor 150' and variable resistor 152°. In this manner a high resistance thermistor may be used, which while varying in resistance, will, at all temperatures, pass very little current, thus mitigating the problem of self-heating. The variable current passing therethrough controls the current flowing from the positive terminal of battery 10 through resistor 182 and transistor 180 to the gate of SCR 130.

A second thermistor 190 is also provided in the circuit of FIG. 5 to provide a degree of compensation for possible temperature sensitivity of SCR 130. Thermistor 190 is in parallel with a second resistor 192 and both resistors are in turn in series with variable resistor 142 and resistor 140 in the voltage sensing circuit.

It will be noted that in both FIG. 4 and FIG. 5 diode 156 of the circuit of FIG. 3 has been omitted and instead the voltage from the temperature sensing circuit is superposed directly upon the voltage sensing circuit supplying gate 130a of SCR 130. As previously described, this omission of the diode is desirable when an SCR is used as a voltage detector in order to decrease the impedance level in the gate circuit. However, to accomplish firing of the SCR 130 via such circuits, the temperature sensing circuit must have a relatively low impedance as viewed from its output. Hence, a possible problem of self-heating of the thermistor arises, necessitating in turn the use of another active device such as the transistor 180 in FIG. 5 whereby the current passed from the temperature sensing circuit into the voltage sensing circuit can be increased while maintaining a reasonably high impedance level in the thermistor circuit.

Figure 6:
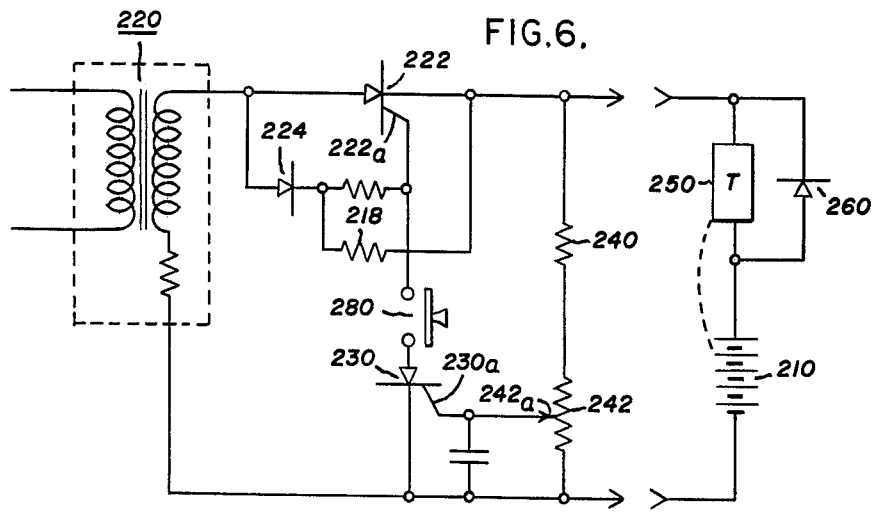

In FIG. 6, an alternate circuit is shown wherein the temperature sensing means comprises a thermostat 250 in series with battery 210. Charging current, which is half-wave in the illustrated embodiment, at a high rate is supplied to battery 210 through SCR 222. As in the embodiments previously described, battery voltage is sensed by a voltage divider comprising resistor 240 and variable resistor 242 which may be adjusted to set the desired voltage cut-off value. The gate 230a of SCR 230 is connected to variable contact 242a of resistor 242 to fire SCR 230 when the voltage at contact 242a reaches a predetermined value. This will connect gate 222a of SCR 222 to the negative terminal of battery 210 to turn off SCR 222.

In this embodiment the high charge rate is discontinued in response to temperature by the opening of the contacts of thermostat 250. When this occurs, the charger voltage during the charging half-cyle rises due to disconnecting of the battery load thereon. This, in turn, causes a voltage rise across the voltage divider comprising resistors 240 and 242. SCR 222 is then shut off due to firing of SCR 230 as previously described.

A diode 260 is placed in series with battery 210 across the terminals of thermostat 250. The polarity of diode 260 does not permit flow of charging current, but it permits flow of holding current from the battery during the zero source voltage periods to thus keep SCR 230 in a conducting state.

Thermostat 250 preferably automatically resets, thus permitting flow of low charge rate current to battery 210 through diode 224 and resistor 218 after the battery has cooled sufficiently.

Thus the invention described novel means for controlling the charge rate in a rechargeable battery by monitoring both the cut-off voltage and the temperature of the battery and providing logic means for transmitting signals from either of the sensors to the current turn-off means. It will be apparent that minor modifications may be made in the circuit based, for example, upon the selection of components to carry out the desired functions. Such modifications will be obvious to those skilled in the art and should be deemed to be within the scope of the invention as limited only by the appended claims.

What we claim as new and desire to secure by Letters Patent of the United States is:

1. A battery charging system comprising:
   a. a rechargeable battery having at least one rechargeable cell;
   b. a source of charging current, electrically coupled to said at least one cell, for supplying charging current to said at least one cell along a first circuit path;
   c. temperature detecting means thermally coupled to said battery to monitor the temperature of said battery and to generate a signal in response thereto;
   d. voltage detecting means electrically coupled to said at least one cell for sensing the voltage of said at least one cell and for providing a signal in response thereto;
   e. switch means, electrically coupled in series in said path, having only two stable modes, said first mode being a conductive mode for transmitting said charge current therethrough at a substantially high uniform charging rate to said at least one cell and said second mode being a nonconductive mode for blocking the flow of said charge current therethrough;
   f. control means, electrically coupled to said temperature and voltage detecting means and to said switch means, invariably responsive to a predetermined signal from either said temperature or voltage detecting means to abruptly switch said switch means from said conductive mode to said nonconductive mode, said predetermined signals from said voltage and temperature detecting means corresponding, respectively, to a voltage approximating full charge of said at least one cell and to a temperature beyond which damage to said at least one cell could occur.

2. The charging system of claim 1 wherein said voltage detecting means comprises a voltage divider connected across the terminals of said battery, said control means comprises a first thyristor electrically connected to said switch means, and an intermediate point on said voltage divider is coupled to the gate of said first thyristor to activate said first thyristor when the voltage at said intermediate point on said voltage divider reaches a predetermined level to provide said predetermined signal to thereby cause said first thyristor to conduct to switch said switch means to said nonconductive mode.

3. The charging system of claim 2 wherein said switching means comprises a second thyristor having its gate coupled to said first thyristor.

4. The charging system of claim 3 wherein said source has a pulsed DC current output and means are provided to prevent said first thyristor from being initially biased into conduction during the periods when the voltage imposed on said cell by current pulses is greater than the cell voltage to prevent premature cut-off of the high charge rate before the cell has reached a predetermined voltage.

5. The charging system of claim 1 wherein said temperature detecting means comprise a thermistor in series with a second resistor to provide a temperature variable intermediate voltage coupled to said control means.

6. The charging system of claim 1 wherein said switching means comprise a solid state switching device.

7. The charging system of claim 6 wherein said solid state switching device comprises a thyristor and said control means is electrically coupled to the gate of said thyristor to turn off said thyristor.

8. The charging system of claim 1 wherein said predetermined signals are voltage threshold signals and said control means includes means for detecting said voltage threshold signals.

9. The charging system of claim 1 wherein said system includes a reference voltage source; said temperature detecting means comprises a first differential amplifier, a first voltage divider including a thermistor coupled to said cell, the input of one side of said first amplifier coupled to an intermediate point of said first voltage divider and the input of the other side coupled to the output of said reference source; and said voltage detecting means comprises a second differential amplifier, a second voltage divider across said cell, the input of one side of said second amplifier coupled to an intermediate point of said second divider and the input of the other side of said amplifier coupled to the output of said reference source.

10. The charging system of claim 9 wherein said charging source has an output charging current in the form of current pulses and has an output terminal means providing a source of voltage pulses; said system further comprises means, coupled between the output of the voltage source and the input of said other side of said second amplifier, biasing said other side thereof with voltage pulses of a greater magnitude than the voltage pulses imposed on said second divider by said cell and thereby said voltage detecting means is responsive only to the voltage of said cell between current pulses from said charge source.

11. The system of claim 1 wherein a second circuit path is provided across switch means supplying a low rate charging current to said cell when said switch means is in said nonconductive mode.

12. A battery charging system comprising:
   a. a rechargeable battery having at least one rechargeable cell;
   b. a current source means, connected in series with said cell, for supplying charging current to said cell at a high charge rate along a first circuit path;
   c. a switching thyristor having a cathode terminal connected to one terminal of said cell, an anode terminal connected to said source, and a gate terminal, said switching thyristor having only a conductive mode for transmitting said charge current at a high charge rate to said cell and a nonconductive mode for terminating said charging current at said high charge rate;
   d. first and second voltage dividers connected in parallel and having the common terminals thereof connected across said cell, said first divider including a resistive element and a thermal sensing means to sense the temperature of said cell, said first divider developing a voltage thereacross responsive to the temperature of said cell;
   e. a transistor having a base, emitter and collector, said base being coupled to a point between said resistive element and said thermal means, and said collector coupled to said source;
   f. a control thyristor having a gate lead coupled with an intermediate point of said second voltage divider and with the emitter of said transistor, an anode lead coupled to the gate terminal of said switching thyristor, and a cathode lead coupled to said source means, said control thyristor operable to change the mode of said switching thyristor from said conductive to said nonconductive mode in response to a predetermined voltage developed across one of said first and second voltage dividers.

13. The system of claim 12 wherein the source means has a pulsed DC current output, means coupled between said source means and said cathode lead of said control thyristor for biasing said control thyristor to a nonconductive state during periods when said cell is being charged by said current pulses and thereby said control thyristor may only be biased conductive between said current pulses.

14. The system of claim 12 wherein a second circuit path is provided across switch means supplying a low rate charging current to said cell when said switch means is in said nonconductive mode.

15. A battery charging system comprising:
   a. a rechargeable battery having at least one rechargeable cell;
   b. a source of charging current, electrically coupled to said at least one cell, for supplying charging current to said at least one cell along a first circuit path;
   c. a temperature detecting means comprising a thermostat, thermally coupled to said battery and electrically in series with said battery, to monitor the temperature of said battery and to generate a signal in response thereto;
   d. a voltage detecting means comprises a voltage divider electrically coupled to at least one rechargeable cell for providing a voltage signal to the gate of said thyristor which will vary in proportion to the voltage of said at least one cell to which the detecting means is coupled;
   e. switch means, electrically coupled in series in said circuit path and having only a conducting mode for transmitting said charge current therethrough at a substantially high uniform charging rate to said at least one cell and a nonconductive mode for blocking the flow of said charge current therethrough;
   f. control means, electrically coupled to said temperature and voltage detecting means and to said switch means, responsive to a predetermined signal from either said temperature or voltage detecting means to switch said switch means from said conductive mode to said nonconductive mode, said predetermined signals from said voltage and temperature detecting means corresponding, respectively, to a voltage approximating full charge of said at least one cell and to a temperature beyond which damage to said at least one cell could occur; and
   g. said source comprises rectification means whereby opening of the contacts of said thermostat causes the voltage of said charge current source to rise, thereby causing the voltage across said voltage divider to rise to cause said control means to switch said switch means to said nonconductive mode.

16. The charging system of claim 15 wherein said control means include a first thyristor having an anode terminal coupled to said switch means and a gate terminal coupled to said voltage divider, and said system further includes diode means across said thermostat and electrically coupled to said anode of said first thyristor, said diode means being nonconductive to said charging current and conductive to battery current in a direction opposite to said charging current for transmitting battery current to the anode of said first thyristor to maintain said thyristor in a conductive state and thereby maintain said switch means in a nonconductive mode.

* * * * *